United States Patent [19]

Fukayama et al.

[11] Patent Number: 4,704,419

[45] Date of Patent: Nov. 3, 1987

[54] ORGANOSILOXANE PRIMER COMPOSITION

[75] Inventors: Miyoji Fukayama; Masayuki Ohnishi, both of Chiba, Japan

[73] Assignee: Toray Silicone Co., Ltd., Tokyo, Japan

[21] Appl. No.: 919,354

[22] Filed: Oct. 16, 1986

[30] Foreign Application Priority Data

Oct. 30, 1985 [JP] Japan ................................ 60-243561

[51] Int. Cl.$^4$ .............................................. C08K 5/54
[52] U.S. Cl. .................................................... 524/188
[58] Field of Search ........................ 524/188, 262, 266

[56] References Cited

U.S. PATENT DOCUMENTS 4,535,109 8/1985 Kondo ................................ 524/188

Primary Examiner—Paul R. Michl
Attorney, Agent, or Firm—Robert Spector

[57] ABSTRACT

The adhesion of paints to cured silicone rubber can be achieved using primer compositions comprising (1) a dialkoxysilane containing a substituted or unsubstituted amino group that is bonded to silicon by means of a divalent hydrocarbon radical, (2) a liquid, hydroxyl terminated polyorganosiloxane, and (3) an organic solvent.

8 Claims, No Drawings

ORGANOSILOXANE PRIMER COMPOSITION

BACKGROUND OF THE INVENTION

1. Field of the Invention

The present invention relates to primer compositions, and more particularly to a polyorganosiloxane primer composition for use in the coating of paints on the surfaces of crosslinked polyorganosiloxanes, and especially on the surfaces of crosslinked and cured silicone rubbers.

2. Description of The Prior Art

Silicone rubber which has been cured by crosslinking, for example, silicone rubber sealants and coating materials, has an excellent heat resistance, cold resistance, weather resistance and fatigue resistance and so has come to be employed in a broad range of applications. In particular, silicone sealants are advantageously applied in joints susceptible to considerable movement or at outdoor locations.

The cured form of these silicone rubber sealants and coatings suffer from the significant defect that their surfaces cannot be adequately coated with paint, or the coating operation is a difficult one. Due to this defect, silicone rubber sealants and coatings are limited in their applications, although they have excellent properties.

Various methods have therefore been considered for improving the paintability of cured silicone rubber sealants. One such method involves the use of additives, and is taught in Japanese Laid-Open Patent Application Number 58-157860 [157860/83] and in U.S. Pat. No. 4,447,576, which issued to Fukayama and Ichiijo on May 8, 1984. Both of these publications describe curable organosiloxane compositions comprising a hydroxyl terminated polyorganosiloxane and a silicone compound containing two or more amide and/or aminoxy groups. The additive present in the compositions of the Japanese application is a dialkoxysilane having a mercapto, amino, acryloxy or epoxy group that is bonded to silicon through a divalent organic group. The additive in the compositions of the United States Patent is an alcohol with an acyloxy, alkoxycarbonyl, —COOH, cyano, amino, amido or mercapto group or the combination of a carbon-to-carbon triple bond and at least one ether type oxygen atom. These additives are less than desirable because they are limited to a specific curing system and therefore cannot be used with all types of curable silicone rubber compositions. Another problem with these additives is that they detract from the unmodified properties of the cured silicone rubber to a greater or lesser degree.

Primer compositions have also been investigated as an alternative approach to improving the paintability of cured silicone rubber. For example, Canadian Pat. No. 1,142,818, which issued on Mar. 15, 1983 teaches applying an amino substituted silane as a primer prior to coating cured silicone rubber with paint. However, when only this amino group-containing alkoxysilane is employed as the primer between silicone rubber and paint, the bonding strength is poor. In particular, amino group-containing dialkoxysilanes provide little bonding strength.

Japanese published application No. 55-62,960 [62,960/80], published on May 12, 1980, discloses primer compositions for bonding cold-curing silicone rubber to plastics and rubbers. The compositions contain 100 parts by weight of an essentially linear polydiorganosiloxane containing at least two silicon-bonded hydroxyl groups per molecule, from 1 to 100 parts by weight of a silane containing at least 2 alkoxy groups and an aminoalkyl group bonded to silicon, and from 1 to 100 parts by weight of ethyl silicate or a partial hydrolyzate thereof.

The object of the present invention is to provide a primer composition which (1) will not adversely affect the properties of the cured silicone rubber sealant or coating, (2) can be used with any silicone rubber curing system, and (3) can tightly bond paint to the cured silicone rubber.

The present inventors have discovered that this objective can be achieved by omitting the ethyl silicate or a hydrozylate thereof from compositions described in the aforementioned Japanese published application No. 55-62,960, and using the combination of an amino substituted dialkoxysilane, referred to hereinafter as ingredient A, with a liquid polyorganosiloxane containing at least two hydroxyl groups per molecule, referred to hereinafter as ingredient B.

DETAILED DESCRIPTION OF THE INVENTION

This invention provides a primer composition comprising (A) an amino group-containing dialkoxysilane or a partial hydrolysis condensate thereof, wehre said dialkoxysilane exhibits the general formula

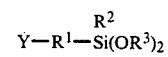

Y represents a substituted or unsubstituted monovalent amino group, $R^1$ is a divalent radical selected from the group consisting of alkylene, phenylene, haloalkylene, oxyalkylene, dioxyalkylene and divalent combinations of two or more members of said group, and $R^2$ and $R^3$ are individually selected from the group consisting of monovalent hydrocarbon radicals, and substituted monovalent hydrocarbon radicals where the substituent is halogen or alkoxy;

(B) a hydroxyl group-terminated polyorganosiloxane exhibiting a viscosity of from $1 \times 10^{-5}$ to $1 \times 10^{-2}$ $m^2$/second at 25° C. and (C) an organic solvent.

Typically from about 10 to about 500 parts by weight of ingredient B are present per 100 parts by weight of ingredient A, however the present invention is not limited to these ranges.

When used in combination with the polyorganosiloxane referred to hereinafter as ingredient B the amino group-containing dialkoxysilane, or a partial hydrolysis condensate thereof, that constitutes ingredient A of the present invention is the critical ingredient for imparting paintability to the surface of cured silicone rubbers. Primer compositions lacking ingredient A will not provide for the coating or bonding of paint on the surface of cured silicone rubbers.

Primer compositions containing ingredient A will allow for the coating and bonding of various paints on the surface of a cured silicone rubber. Surprisingly, ingredient A is limited to amino group-containing dialkoxysilanes and the partial hydrolysis condensates thereof. When an amino group-containing trialkoxysilane is used, the resulting primer composition has poor stability and also does not provide the paintability which is the object of the present invention.

In the foregoing formula for ingredient A, Y represents an amino ($NH_2$) group or an N-substituted amino group. Typical substituted amino groups include, but are not limited to $H_2NCH_2CH_2NH—$, $H_2N(CH_2CH_2NH)_2—$ and N,N-dialkylamino such as $(CH_3CH_2)_2N—$ $R^1$ can be alkylene, haloalkylene, or phenylene. Alternatively $R^1$ can be oxyalkylene or dioxyalkylene. Specific examples of $R^1$ include but are not limited to methylene, ethylene, propylene, butylene, chloroethylene, fluoroethylene, phenylene, oxyalkylene radicals such as $—CH_2OCH_2CH_2CH_2—$, $—CH_2CH_2OCH_2CH_2—$ and $$—CH_2OCH(CH_3)CH_2—,$$

dioxyalkylene radicals such as $—CH_2OCH_2CH_2OCH_2CH_2—$ and divalent radicals in which 2 or more of these radicals groups are combined with each other. $R^2$ and $R^3$ represent identical or different monovalent hydrocarbon radicals that optionally contain one or more halogen atoms or alkoxy groups as substituents. Specific, non-limiting examples of R2 and R3 include methyl, ethyl, propyl, octyl, phenyl, vinyl and 3,3,3-trifluoropropyl. In particular, alkyl and alkoxyalkyl groups are preferred for $R^3$.

Specific examples of ingredient A include but are not limited to the following compounds:
gamma-aminopropylmethyldimethoxysilane,
gamma-aminopropylmethyldiethoxysilane,
gamma-(beta-aminoethylamino)propylmethyldimethoxysilane,
gamma-(beta-aminoethylamino)propylmethyldiethoxysilane, $$H_2N(CH_2)_2NH(CH_2)_2NH(CH_2)_3Si(OCH_3)_2 \text{ (CH}_3\text{)},$$

$$CH_3—CH(NH_2)CH_2CH_2Si(OCH_3)_2 \text{ (CH}_3\text{)} \text{ and}$$

$$H_2N(CH_2)_2NH(CH_2)_4Si(OCH_2CH_2OCH_3)_2 \text{ (CH}_3\text{)}.$$

Ingredient A can include one or more of these amino group-containing dialkoxysilanes. Alternatively, the partial hydrolysis condensates of these dialkoxysilanes can be used, or the mixture of a dialkoxysilane and its condensation product.

Ingredient B of the present compositions imparts an affinity for the surface of cured silicone rubbers and thereby improves the bonding of these compositions to the rubber.

Preferred embodiments of ingredient B include alpha,omegadihydroxypolydiorganosiloxanes of the general formula $$HO—[R_2SiO]_n—H.$$

In the foregoing formula the radicals represented by R can be identical or different. The R radicals represent monovalent hydrocarbon, halohydrocarbon or cyanohydrocarbon radicals, and n has a value equivalent to a viscosity of from about $1 \times 10^{-5}$ to about $1 \times 10^{-3}$ m2/second at 25° C. Alternatively, the straight chain represented in the foregoing formula for ingredient B can contain some branching, in which instance the molecule would contain three or more hydroxyl groups.

Specific examples of R include but are not limited to alkyl such as methyl, propyl and octyl; alkenyl such as vinyl and allyl, aryl such as phenyl and tolyl and substituted hydrocarbon such as chloromethyl, cyanoethyl and 3,3,3-trifluoropropyl. In preferred embodiments of ingredient B at least 70% of the R radicals are methyl. Most preferably all of the R radicals are methyl, this preference being based on the availability of the corresponding starting materials.

The viscosity of ingredient B should be within the range from about $1 \times 10^{-5}$ to about $1 \times 10^{-3}$ m2/second at 25° C. When the viscosity exceeds the upper limit, the resulting composition will have very poor workability. Also, the applicability of paint on the primer layer and its bonding to same will be poor. On the other hand, when the viscosity is below the lower limit of $1 \times 10^{-5}$ m2/second, the resulting primer will not exhibit a satisfactory affinity for the surfaces of silicone rubbers and will be brittle. The viscosity of ingredient B is preferably from $3 \times 10^{-5}$ to $5 \times 10^{-4}$ m2/second.

The terminal groups on each molecule of ingredient B are specified as hydroxyl groups because it is these hydroxyl groups which react with both the amino group-containing dialkoxysilane of ingredient A and the surface of the cured silicone rubber in order to form a film on the rubber's surface.

The relative concentration of ingredient B is typically from about 10 to about 500 parts by weight and preferably from 50 to 400 parts by weight per 100 parts by weight of ingredient A, however it is not limited to these ranges.

The organic solvent that constitutes ingredient C of the present compositions serves to disperse both ingredients A and B uniformly and reduce the viscosity of the resultant primer composition, thereby improving both workability when the primer is coated on the surface of the silicone rubber, and the primer's coatability. As a result, the primer can be uniformly coated on the rubber's surface.

Ingredient C must be miscible with both components A and B and should boil within the range of from about 50° to 200° C. Specific examples of useful solvents include but are not limited to alcohols such as ethanol, isopropanol, t-butanol and methyl Cellosolve; hydrocarbon solvents such as toluene, benzene, xylene and hexane; ketones such as acetone and methyl ethyl ketone; esters such as ethyl acetate, butyl acetate and ethylene glycol diacetate; chlorinated hydrocarbon solvents such as trichloroethylene and trichloroethane; volatile organosilicon compounds such as hexamethyldisiloxane, hexamethylcyclotrisiloxane and octamethylcyclotetrasiloxane; and mixtrues of these organic solvents.

The concentration of ingredient C is generally from about 10 to 1,000 parts by weight, preferably from 50 to 600 parts by weight, per 100 parts by weight of ingredient A, but it is not limited to these ranges.

In addition to ingredients A, B, and C, the present compositions can include a catalyst for the hydrolysis and/or condensation of the silane ingredients. Preferred catalysts include organotin compounds and titanium compounds. Typical organotin compounds include dibutyltin diacetate, dibutyltin dilaurate, dibutyltin dioctoate, dioctyltin dilaurate, dibutyltin maleate, stannous octoate and dioctyltin oxide. Typical titanium compounds include tetraisopropyl titanate, tetrabutyl titanate, titanium diisopropoxybis(ethyl acetoacetate), titanium diisopropoxybis(acetylacetone) and titanium dibutoxybis(methyl acetoacetate).

The present compositions can contain various additives, including pigments, dyes and inorganic fillers, so long as these additives do not adversely affect the ability of the compositions to effectively function as primers for bonding paints to cured silicone rubber.

The compositions of this invention can be prepared by blending ingredients A, B and C, together with any optional additives, including catalysts, to homogeneity while preferably excluding moisture. The resultant composition is stored in a hermetically sealed container, such as a glass bottle or metal cartridge, and is applied at the time of use to the surface of the silicone rubber by brush coating, spray coating, roll coating or immersion. Paint is then applied on the dried primer composition and the paint will be tightly bonded to the silicone rubber.

The primer compositions of this invention are particularly effective when applied to cured silicone sealants on buildings and other structures if the cured sealant requires painting after being applied and cured, and to silicone rubber coatings requiring painting.

EXAMPLES

The following examples describe preferred compositions and should not be interpreted as limiting the scope of the present invention as set forth in the accompanying claims. All parts and percentages are by weight unless otherwise specified and viscosity values are measured at 25° C.

The "primer coatability test," "application test" and "bonding test" in the examples are conducted according to the following procedures.

PRIMER COATABILITY TEST

The primer composition being evaluated was applied in a single coating operation over one entire surface of a silicone rubber sheet using a brush. The portion of the surface wetted by the primer was measured and expressed as a percentage of the total surface to which primer was applied.

APPLICATION TEST

The primer composition was applied to a silicone rubber sheet. When the coatability was poor, 2 or 3 coats of primer were applied in order to coat the primer composition over the entire surface to the maximum extent possible. The coated surface was then allowed to dry at room temperature for 24 hours and a paint was then applied in a single coating operation using a brush. The extent to which the surface was wetted by the paint, was measured and expressed as a percentage of the total surface area over which paint was applied.

BONDING TEST

Following the application test, the paint was coated 2 or 3 times in the event of paint "crawling" in order to coat the entire surface to the maximum extent possible. After sufficient curing of the paint had been confirmed, an 18 mm-wide strip of cellophane tape was applied to the paint film. The cellophane tape was then peeled off in order to determine the amount of paint removed from the surface of the rubber. The percentage of the surface from which paint could not be removed is listed in the accompanying table.

EXAMPLE 1

Gamma-(beta-aminoethylamino)propylmethyldimethoxysilane (10 parts), alpha,omega-dihydroxydimethylpolysiloxane (20 parts; viscosity=$8 \times 10^{-5}$ m$^2$/second), isopropyl alcohol (40 parts) and dibutyltin dilaurate (1 part) were mixed to homogeneity to obtain a primer composition (I) of this invention.

This primer composition was applied on a 3 mm thick sheet of cured silicone rubber SH790 (single-package type low modulus silicone sealant from Toray Silicone Co., Ltd.) in order to examine the primer's coatability in the coatability test. The sheets were then coated with one of four different paints and subjected to application and bonding tests (only paint A was subjected to the application test because the other 3 paints contain organic solvent systems and their applicability rating was therefore 100%).

Paint A was a synthetic resin emulsion paint (Atom Marine Paint from Atom Chemical Co., Ltd.), paint B was a synthetic resin paint (SD Hols from Kansai Paint Co., Ltd.), paint C was an acrylic resin paint (Vinidelux 300 from Kansai Paint Co., Ltd.) and paint D was a polyurethane paint (Rethane No. 4000 from Kansai Paint Co., Ltd.).

Two primer compositions outside the scope of this invention were prepared by (1) omitting the alpha,omega-dihydroxydimethylpolysiloxane (ingredient B) from primer composition I to obtain Comparative Example 1 and (2) substituting gamma-(betaaminoethylamino)propyltrimethoxysilane for gamma-(beta-aminoethylamino)propylmethyldimethoxysilane as ingredient A in composition I component (A) to obtain Comparative Example 2. All of the primer compositions were coated and evaluated as described in the first portion of this example, and the results are reported in Table 1.

EXAMPLE 2

Gamma-(beta-aminoethylamino)propylmethyldimethoxysilane (10 parts), alpha,omega-dihydroxydimethylpolysiloxane (30 parts; viscosity, $1.5 \times 10^{-4}$ m$^2$/second) and 1,1,1-trichloroethane (16 parts) were mixed to homogeneity to obtain a primer composition. The tests described in Example 1 were conducted using this primer composition and silicone rubber sheets SH790. The results are also reported in Table 1.

TABLE 1

|  |  | Examples | | Comparative Examples | |
|---|---|---|---|---|---|
|  |  | 1 | 2 | 1 | 2 |
| Composition and properties | | AMOUNTS OF INGREDIENTS (PARTS) | | | |
| (A) | H$_2$NCH$_2$CH$_2$NH(CH$_2$)$_3$Si(OCH$_3$)$_2$ CH$_3$ | 10 | 10 | 10 | — |
|  | H$_2$NCH$_2$CH$_2$NH(CH$_2$)$_3$Si(OCH$_3$)$_3$ | — | — | — | 10 |

TABLE 1-continued

| | | | | | |
|---|---|---|---|---|---|
| (B) | alpha, omega-dihydroxydimethyl-polysiloxane | | | | |
| | 8 × 10⁻⁵ m²/second viscosity | 20 | — | — | 20 |
| | 1.5 × 10⁻⁴ m²/second viscosity | — | 30 | — | — |
| (C) | isopropyl alcohol | 40 | — | 40 | 40 |
| | 1,1,1-trichloroethane | — | 16 | — | — |
| | dibutyltin dilaurate | 1 | — | 1 | 1 |
| COATABILITY OF SH790 SILICONE RUBBER | | | | | |
| primer coatability (%) | | 100 | 100 | 50 | 100 |
| applicability (paint A) (%) | | 100 | 100 | 100 | 100 |
| bonding (%) | | | | | |
| paint A | | 100 | 100 | 0 | 50 |
| paint B | | 100 | 100 | 0 | 0 |
| paint C | | 80 | 100 | 0 | 0 |
| paint D | | 80 | 100 | 0 | 0 |

EXAMPLE 3

Gamma-aminopropylmethyldimethoxysilane (10 parts), alpha,omega-dihydroxydimethylpolysiloxane (10 parts; viscosity, 2.0×10⁻⁴ m²/second), toluene (16 parts) and dibutyltin dioctoate (1 part) were mixed to homogeneity to obtain a primer composition, which was then tested by the methods described in Example 1.

COMPARATIVE EXAMPLE 3

Comparative Example 3 was obtained by using gammaaminopropyltrimethoxysilane instead of the gammaaminopropylmethyldimethoxysilane. The resultant primer composition was evaluated using the methods described hereinabove. The results for all tests are reported in Table 2.

TABLE 2

| Composition and properties | Examples 3 | Comparative Examples 3 |
|---|---|---|
| | AMOUNTS OF INGREDIENTS (PARTS) | |
| (A) H₂N(CH₂)₃Si(OCH₃)₂ with CH₃ | 10 | — |
| H₂N(CH₂)₃Si(OCH₃)₃ | — | 10 |
| (B) alpha, omega-dihydroxy-dimethylpolysiloxane (viscosity, 200 cS) | 10 | 10 |
| (C) toluene | 16 | 16 |
| dibutyltin dioctoate | 1 | 1 |
| COATABILITY OF SHO 790 SILICONE RUBBER | | |
| primer coatability (%) | 100 | 100 |
| applicability (paint A) (%) | 100 | 100 |
| bonding (%) | | |
| paint A | 80 | 30 |
| paint B | 100 | 10 |
| paint C | 90 | 0 |
| paint D | 80 | 0 |

EXAMPLE 4

A primer composition was prepared and evaluated as described in Example 1 using a 3 mm-thick sheet of cured silicone rubber SH780 (single-package type high modulus silicone sealant from toray Silicone Co., Ltd.). The results were a coatability of 100%, an applicability of 100% and a bonding of 90% for paint A, 100% for paint B, 70% for paint C and 60% for paint D.

EXAMPLE 5

Instead of gamma-(beta-aminoethylamino)propylmethyldimethoxysilane, its partial hydrolysis condensate is used in the primer composition of Example 1 and the same tests as in Example 1 are conducted. The results are almost identical to the results for Example 1.

That which is claimed is:

1. A primer composition comprising
   (A) an amino group-containing dialkoxysilane or a partial hydrolysis condensate thereof, where said dialkoxysilane exhibits the general formula

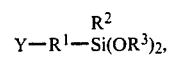

Y represents amino or N,N-dialkylamino, $R^1$ is a divalent radical selected from the group consisting of alkylene, phenylene, haloalkylene, oxalkylene, dioxyalkylene and divalent combinations of two or more members of said group, and $R^2$ and $R^3$ are individually selected from the group consisting of monovalent hydrocarbon radicals, and substituted monovalent hydrocarbon radicals where the substituent is halogen or alkoxy;
   (B) a hydroxyl group-terminated polyorganosiloxane exhibiting a viscosity of from $1 \times 10^{-5}$ to $1 \times 10^{-2}$ m²/second at 25° C. and
   (C) an organic solvent.

2. The primer composition of chain 1 where Y represents —NH₂,

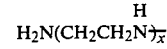

or N,N-dialkylamino and x is 1 or 2.

3. The primer composition of claim 2 where Y represents (CH₃CH₂)₂N—.

4. The primer composition of claim 1 where said composition contains from 10 to 500 parts by weight of said polyorganosiloxane per 100 parts by weight of said dialkoxysilane or partial hydrolysis condensate thereof.

5. The primer composition of claim 1 where $R^1$ represents alkylene, haloalkylene, phenylene, —CH₂OCH₂CH₂CH₂—, —CH₂CH₂OCH₂CH₂—, —CH₂OCH₂CH₂OCH₂CH₂—, or —CH₂OCH(CH₃)CH₂—, $R^2$ is selected from the group consisting of methyl, ethyl, propyl, octyl, phenyl, vinyl and 3,3,3-trifluoropropyl, $R^3$ is selected from the group consisting of methyl, ethyl, propyl, octyl, phenyl, vinyl, 3,3,3- trifluoropropyl, and alkoxyalkyl radicals, and the repeating units of said polyorganosiloxane are represented by th4e formula R₂SiO where R represents a monovalent hydrocarbon, halohydrocarbon or cyanohydrocarbon radical.

6. The primer composition of claim 5 where $R^1$ is propylene, $R^2$ is methyl, $R^3$ is methyl, R is selected from the group consisting of methyl, propyl, octyl, vinyl, allyl, phenyl, tolyl, chloromethyl, cyanoethyl and 3,3,3-trifluoropropyl, said organic solvent is selected from the group consisting of alcohols, liquid hydrocarbons, ketones, esters, chlorinated hydrocarbons, and volatile organosilicon compounds, the concentration of said solvent is from 10 to 1000 parts by weight per 100 parts of said dialkoxysilane, and said composition contains a hydrolysis catalyst for said dialkoxysilane.

7. The primer composition of claim 6 where at least 70 percent of said R radicals are methyl, the viscosity of said polydiorganosiloxane is from $3 \times 10^{-5}$ of $5 \times 10^{-4}$ m$^2$/second at 25° C., said solvent is an alcohol, a hydrocarbon or a chlorohydrocarbon, the concentration of solvent is from 50 to 600 parts by weight per 100 parts by weight of said dialkoxysilane, and the hydrolysis catalyst is an organotin compound or a titanium compound.

8. The primer composition of claim 7 where the dialkoxysilane is gamma-(beta-aminoethylamino) propylmethyldimethoxysilane, its partial hydrolyzate, or gamma-aminopropylmethyldimethoxysilane, the polydiorganosiloxane is a polydimethylsiloxane, the organic solvent is isopropyl alcohol, 1,1,1-trichloroethane or toluene and the hydrolysis catalyst is dibutyltin dioctoate or dibutyltin dilaurate.

* * * * *